US011999044B2

(12) United States Patent
Wang

(10) Patent No.: US 11,999,044 B2
(45) Date of Patent: Jun. 4, 2024

(54) ONE-WAY OIL-WAY DRIVEN EXPANSION AND RETRACTION MOVEMENT TOOL

(71) Applicant: Kun-Wang Wang, Tainan (TW)

(72) Inventor: Kun-Wang Wang, Tainan (TW)

( * ) Notice: Subject to any disclaimer, the term of this patent is extended or adjusted under 35 U.S.C. 154(b) by 113 days.

(21) Appl. No.: 17/719,964

(22) Filed: Apr. 13, 2022

(65) Prior Publication Data

US 2022/0362918 A1 Nov. 17, 2022

(30) Foreign Application Priority Data

May 14, 2021 (TW) ................................ 110117481

(51) Int. Cl.
*B25F 5/00* (2006.01)
*F15B 15/14* (2006.01)
*B25B 27/20* (2006.01)

(52) U.S. Cl.
CPC .......... *B25F 5/005* (2013.01); *F15B 15/1414* (2013.01); *B25B 27/205* (2013.01)

(58) Field of Classification Search
CPC .... B25F 5/005; F15B 15/1414; B25B 27/205; B25B 5/064; B25B 27/20; B25B 7/126; B25B 7/22
USPC .......................................................... 173/218
See application file for complete search history.

(56) References Cited

U.S. PATENT DOCUMENTS 728,068 A * 5/1903 Young ..................... B26B 15/00 30/228
2,446,011 A * 7/1948 Johnson ................. A01G 3/033 30/372
2,930,122 A * 3/1960 Pfundt .................. A01G 3/033 30/228
3,115,667 A * 12/1963 Lis ....................... A22C 21/066 83/604

(Continued)

FOREIGN PATENT DOCUMENTS

CN 102328294 A 1/2012
CN 207983185 U 10/2018

(Continued)

OTHER PUBLICATIONS

U.K. Search Report for corresponding GB2205531.3 dated Oct. 11, 2022.

*Primary Examiner* — Thomas M Wittenschlaeger
*Assistant Examiner* — Katie L Gerth
(74) *Attorney, Agent, or Firm* — Egbert, McDaniel & Swartz, PLLC

(57) ABSTRACT

A one-way oil-way driven expansion and retraction movement tool includes a hydraulic driving structure, two long arm rods and two connecting rods, wherein, the hydraulic driving structure has a cylinder barrel, a plunger and a shaft rod, the two arm rods are opposite each other and are opposite the two sides of the shaft rod in the lateral direction. One end of each arm rod is respectively pivoted on the cylinder barrel, and the other end of each arm rod is respectively used for arranging a working piece, so that each (Continued)

working piece can move toward or away from each other to execute corresponding work. The connecting rods are respectively pivoted with each of the arm rods and with the connecting part, so that, through the connecting rods, the shaft rod can pull the arm rods to move away from each other or toward each other.

9 Claims, 7 Drawing Sheets

(56) References Cited

U.S. PATENT DOCUMENTS 3,228,101 A * 1/1966 William ................ B25B 27/205 29/229
3,365,782 A * 1/1968 Madeira ................ B25B 27/205 D8/27
3,816,874 A * 6/1974 Jahnke ............... A22C 21/0023 452/167
3,893,237 A * 7/1975 Jahnke ................... A22C 17/06 30/228
4,156,959 A * 6/1979 Weisenburger ......... B25B 27/12 29/225
4,351,097 A * 9/1982 Hashimoto ............. B25B 7/126 294/95
4,558,584 A * 12/1985 Myers ................ H01R 43/0421 72/453.01
4,587,732 A * 5/1986 Lind ...................... H02G 1/005 137/635
4,890,798 A * 1/1990 Tagawa ................. E02F 3/3677 241/101.73
5,058,272 A * 10/1991 Steube .................... B25B 7/126 30/180
5,083,971 A * 1/1992 Karubian ............. A22B 5/0052 452/167
5,253,554 A * 10/1993 Riera ...................... B25B 7/126 81/426
5,381,686 A * 1/1995 Thorup .............. H01R 43/0427 72/453.06
5,454,754 A * 10/1995 Baertlein ............. A22C 11/125 30/228
5,715,604 A * 2/1998 Lanzoni ............. A61B 17/2909 30/252
5,738,289 A * 4/1998 Tagawa ................... E02F 3/965 241/101.73
6,062,971 A * 5/2000 Baertlein ............. A22C 11/125 452/49
6,994,284 B1 * 2/2006 Ramun ................. E02F 3/3636 241/101.73
7,464,578 B2 * 12/2008 Ayer ....................... B25B 27/10 72/407
7,603,932 B2 * 10/2009 Newcomb ............. B23D 17/02 83/13
8,245,561 B2 * 8/2012 Frenken .................. B25B 27/10 72/416
9,832,936 B2 * 12/2017 Ishiguro .................. B26B 15/00
10,967,427 B2 * 4/2021 Hoagland .............. B22D 19/04
2004/0158265 A1 * 8/2004 Wadsworth ...... A61B 17/12009 606/141
2005/0103170 A1 * 5/2005 Del Rio ................... B26D 5/12 81/301
2016/0252112 A1 * 9/2016 Kehoe ..................... B25B 7/126 60/327
2018/0229316 A1 * 8/2018 Brown ................. B21D 39/035

FOREIGN PATENT DOCUMENTS

GB 931504 A 7/1963
GB 2073085 A 10/1981

* cited by examiner

ONE-WAY OIL-WAY DRIVEN EXPANSION AND RETRACTION MOVEMENT TOOL

CROSS-REFERENCE TO RELATED U.S. APPLICATIONS

Not applicable.

BACKGROUND OF THE INVENTION

1. Field of the Invention

The present invention relates generally to a tool that uses a pair of arm rods to move toward or away from each other to execute specific operations, and more particularly to a one-way oil-way driven expansion and retraction movement tool.

2. Description of Related Art Including Information Disclosed Under 37 CFR 1.97 and 37 CFR 1.98

Pliers are tools used to move specific objects to complete specific operations. Pliers have a pair of arms. The arms are opposite each other in the lateral direction. The two arms are respectively extended to form hand gripping parts. A pivot shaft is used to pivot the arms together. By operating the gripping parts, the arms can expand or retract in relation to each other, and based on specific structures of the arms, corresponding operations can be executed. Vises, long flat nose pliers, circlip pliers, or expansion pliers are all actual applications of the above-mentioned pliers.

The conventional pliers can only be used to execute corresponding operations when the arms are in inward retraction or outward expansion movement. In the case of circlip pliers, for example, as circlips can be divided into external circlips and internal circlips, when mounting or removing an external circlip and an internal circlip, the directions of the forces applied upon the external circlip and the internal circlip are different. Therefore, single-structure circlip pliers cannot be applicable both to external circlips and to internal circlips. Users have to use different types of circlip pliers based on different types of circlips. This causes inconvenience to the use and purchase of tools.

BRIEF SUMMARY OF THE INVENTION

The main object of the invention is to provide a one-way oil-way driven expansion and retraction movement tool, which is driven by one-way oil-way.

Based on the above object, the technical feature of the invention to solve the above-mentioned problem mainly lies in that, the one-way oil-way driven expansion and retraction movement tool comprises a hydraulic driving structure, said hydraulic driving structure comprising a cylinder barrel, a plunger and a shaft rod, wherein said cylinder barrel is in the shape of a long column. The cylinder barrel has a first end and a second end. The first end and the second end are opposite each other along the length of the cylinder barrel. The inside of the cylinder barrel is formed with an oil chamber. The oil chamber houses the working fluid. The plunger is movably configured inside the cylinder barrel and located between the oil chamber and the first end, and the plunger is adjacent to the oil chamber. The plunger and the cylinder barrel are tightly fitted with each other, so that the plunger can move toward or away from the first end to change the volume of the oil chamber, thus squeezing or absorbing the working fluid. The shaft rod is configured inside the cylinder barrel. One end of the shaft rod extends into the cylinder to form a bearing part. The other end of the shaft rod goes through the second end and is extended out of the cylinder barrel, and is configured with a connecting part, the bearing part is opposite the plunger, so that the shaft rod can move back and forth along the axial direction under the force of the working fluid.

Two long arm rods are opposite each other in the lateral direction, and the arm rods are respectively opposite the two sides of the shaft rod in the lateral direction. One end of each arm rod is respectively pivoted with the cylinder barrel. The other end of each arm rod is respectively used for configuration of a working piece, so that each working piece can move toward or away from each other to complete the corresponding work.

Two connecting rods are provided. Each connecting rod is respectively pivoted with the arm rods, each connecting rod is respectively pivoted with the connecting part, so that through the connecting rods, the one-way movement of the shaft rod can actuate the arm rods to move back and forth.

Based on an overall structure made up of the hydraulic driving structure and the connecting rods, simply by driving the working fluid in one direction, the shaft rods actuated by the working fluid pumped in one-way oil-way to move in a one-way stroke can cause the arm rods to expand or retract in relation to each other, thus providing more convenience to the use and purchase of tools.

DETAILED DESCRIPTION OF THE INVENTION

Figure 1:
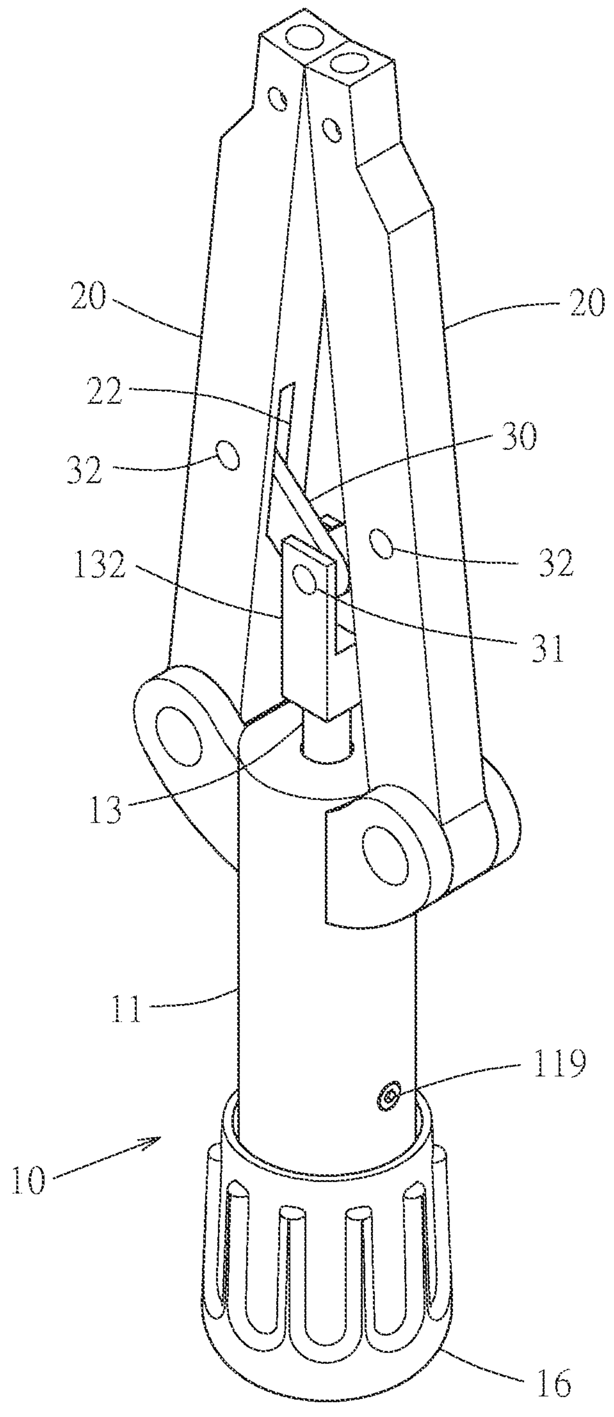
FIG. 1 is a perspective view of a preferred embodiment of the invention.
Figure 2:
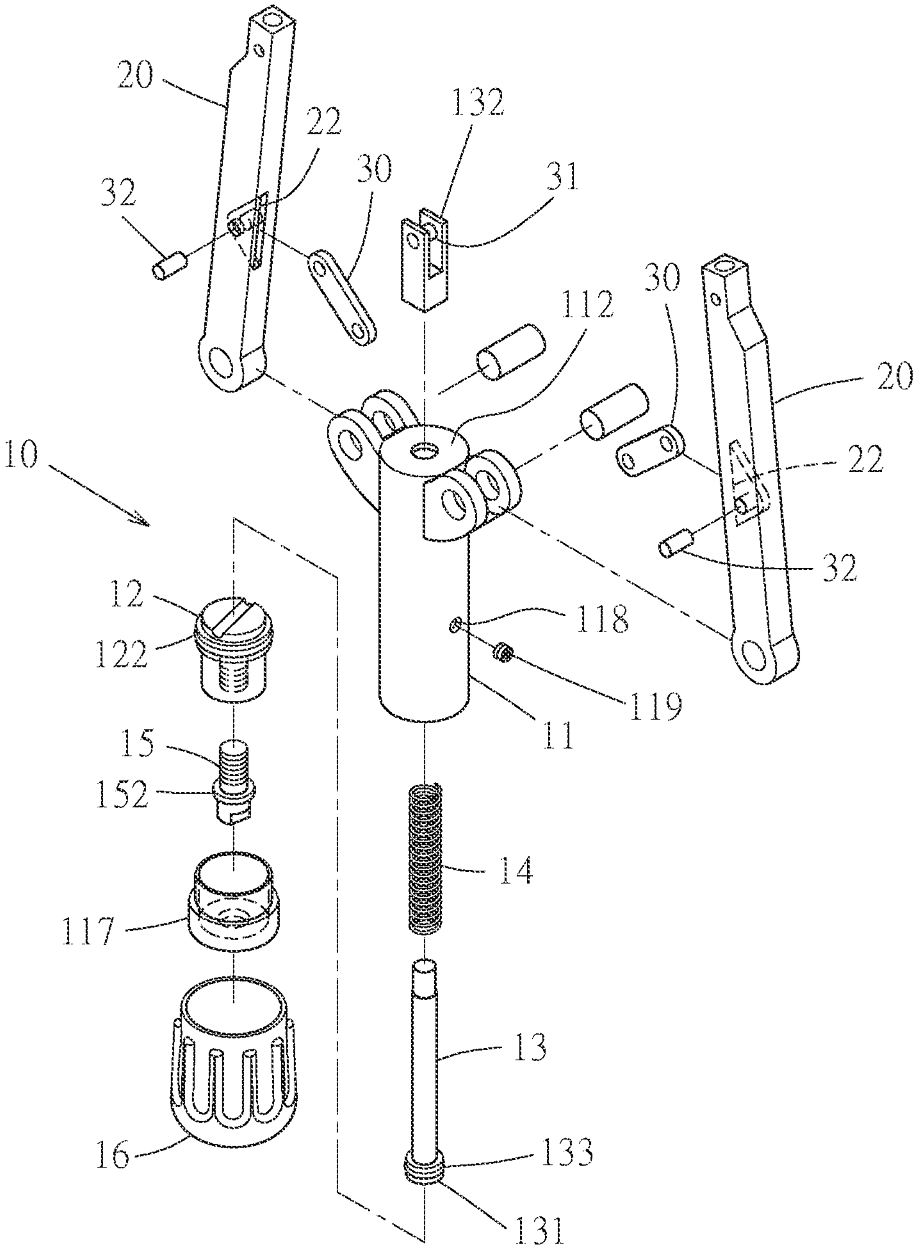
FIG. 2 is an exploded perspective view of a preferred embodiment of the invention.
Figure 3:
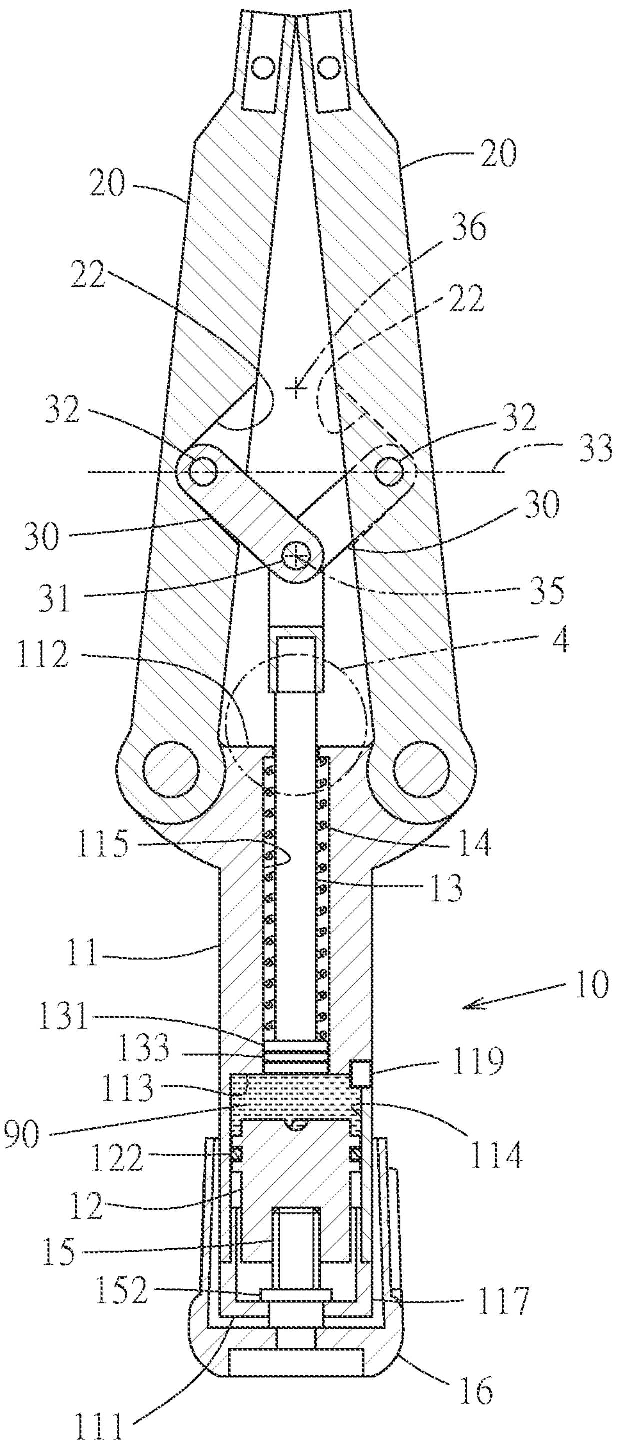
FIG. 3 is a sectional view of a preferred embodiment of the invention.
Figure 4:
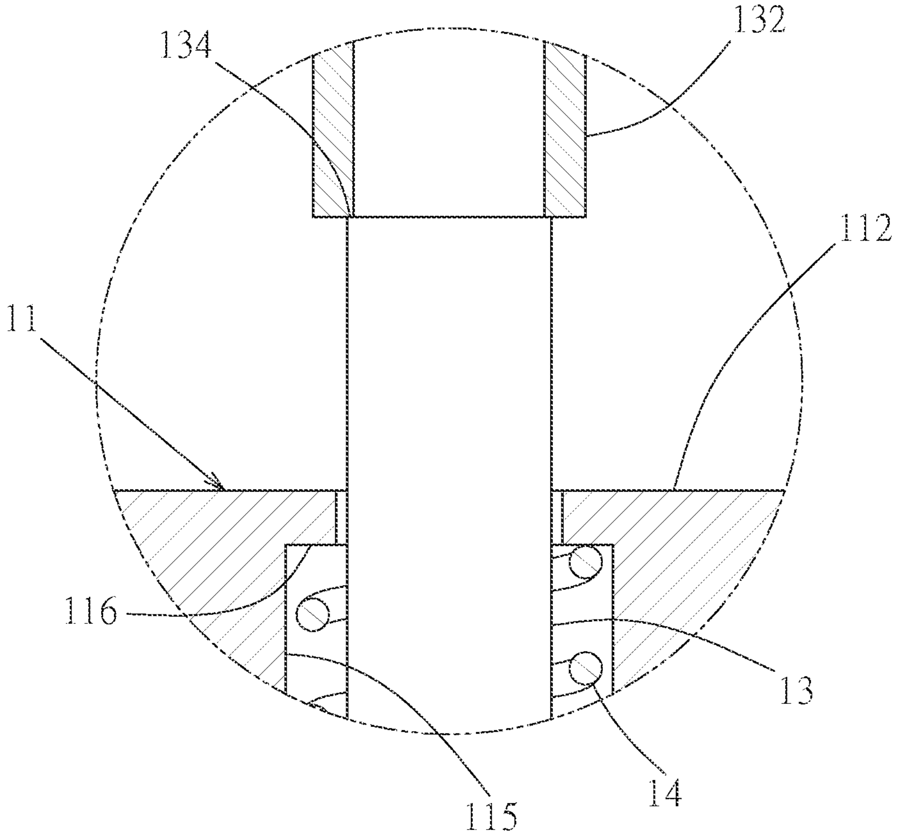
FIG. 4 is a partial enlarged view of FIG. 3.

Depicted in FIG. 1 to FIG. 6 is a preferred embodiment of a one-way oil-way driven expansion and retraction movement tool according to the invention, which comprises a hydraulic driving structure 10, two long arm rods 20 and two connecting rods 30. Said hydraulic driving structure 10 comprises a cylinder barrel 11, a plunger 12 and a shaft rod 13, wherein said cylinder barrel 11 is in the shape of a long column, the cylinder barrel 11 has a first end 111 and a second end 112, the first end 111 and the second end 112 are opposite each other along the length of the cylinder barrel 11. The inside of the cylinder barrel 11 is formed with an oil chamber 113. The oil chamber 113 houses the working fluid 90. The working fluid 90 is preferably hydraulic oil. The plunger 12 is movably configured inside the cylinder barrel 11 and is located between the oil chamber 113 and the first end 111. The plunger 12 is adjacent to the oil chamber 113. The plunger 12 and the cylinder barrel 11 are tightly fitted with each other, so that the plunger 12 can move toward or away from the first end 111 to change the volume of the oil chamber 113, thus squeezing or absorbing the working fluid 90. The shaft rod 13 is configured inside the cylinder barrel 11. One end of the shaft rod 13 is extended into the cylinder barrel 11 to form a bearing part 131, and the other end of the shaft rod 13 goes through the second end 112 and is extended out of the cylinder barrel 11, and is configured with a connecting part 132. The bearing part 131 is opposite the plunger 12, so that the shaft rod 13 can move back and forth along the axial direction under the force of the working fluid 90.

The plunger 12 is sleeved with an elastic first O-ring 122. The first O-ring 122 is pressed tightly against the cylinder barrel 11 and fitted around the sidewall 114 of the oil chamber 113, so that the plunger 12 and the cylinder barrel 11 are tightly fitted with each other, thus enhancing the reliability of the plunger 12 pushing the working fluid 90.

Figure 7:
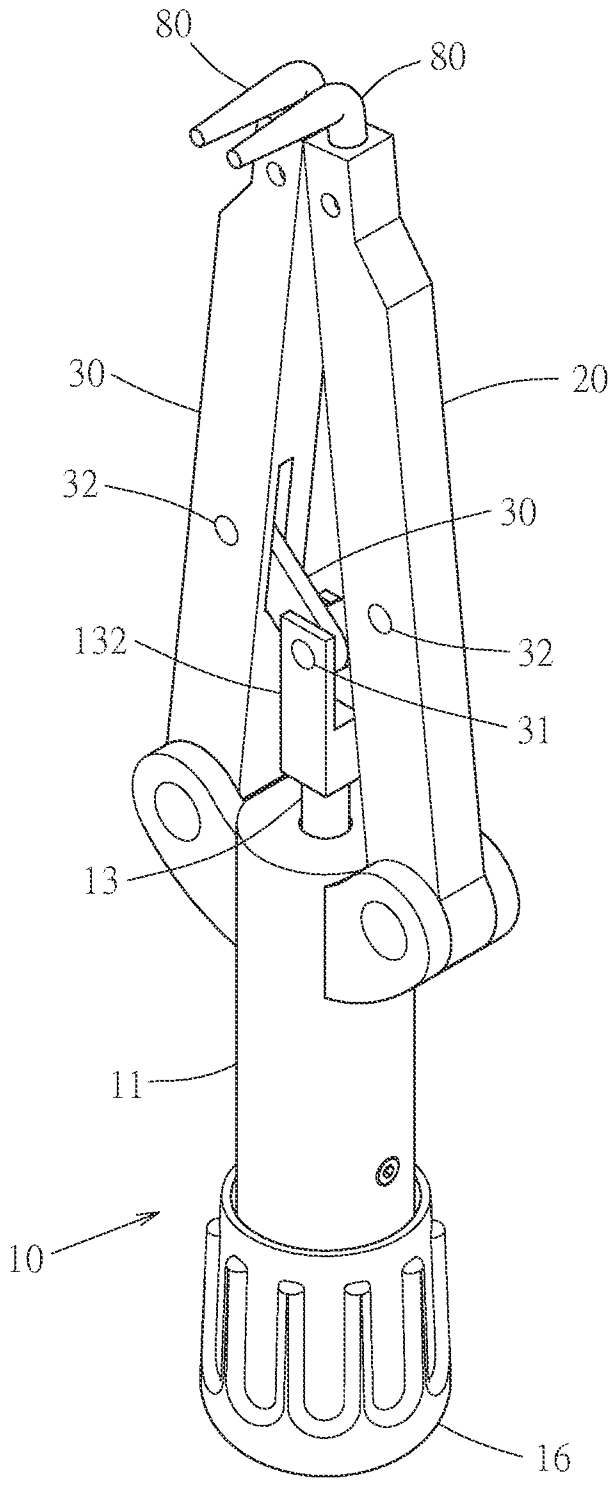
FIG. 7 is a perspective view of a pair of circlip pliers as a preferred embodiment of the invention.

The arm rods 20 are opposite each other in the lateral direction, and the arm rods 20 are respectively opposite the two sides of the shaft rod 13 in the lateral direction. One end of each arm rod 20 is respectively pivoted on the cylinder barrel 11, as shown in FIG. 7, and the other end of each arm rod 20 is respectively used for configuration of a working piece 80, so that each working piece 80 can move toward or away from each other to complete the corresponding work.

Each connecting rod 30 is respectively pivoted with the arm rods 20, each connecting rod 30 is respectively pivoted with the connecting part 132, so that, through the connecting rods 30, the one-way movement of the shaft rod 13 can actuate the arm rods 20 to move back and forth, realizing expansion and retraction in relation to each other.

Figure 5:
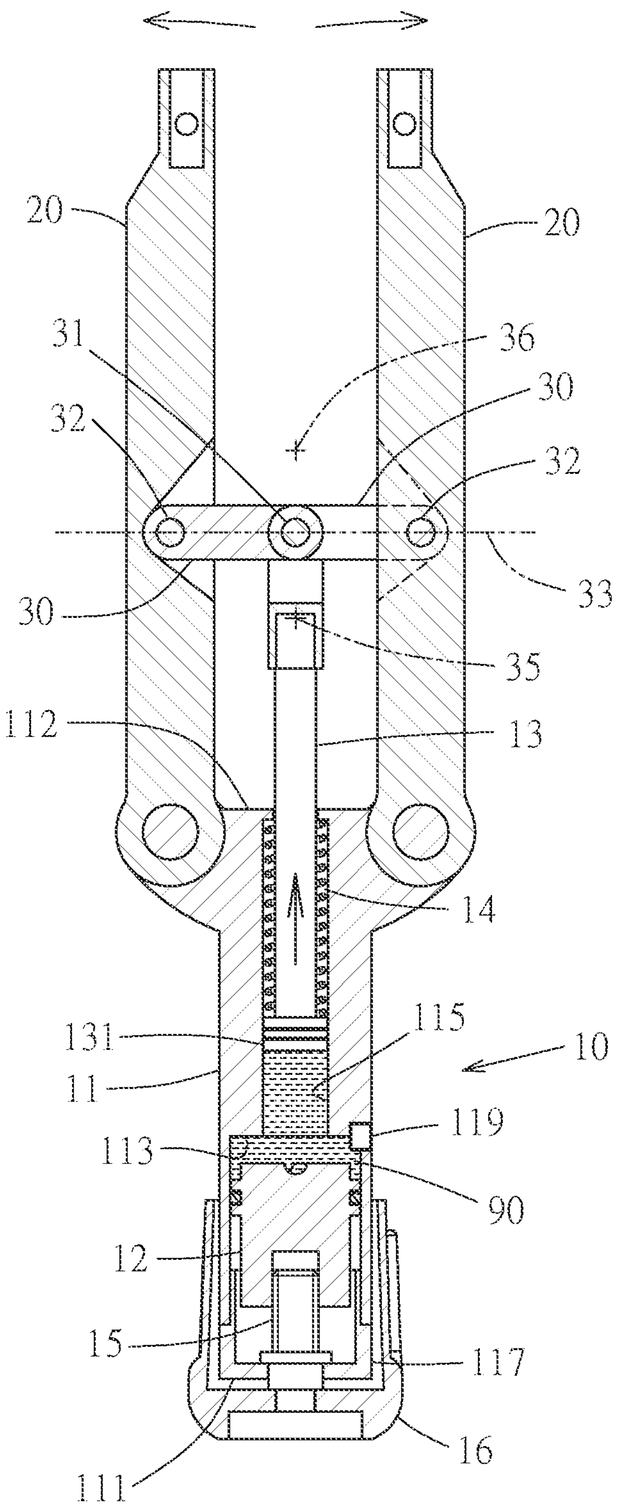
FIG. 5 is a sectional view of the operating state of a preferred embodiment of the invention, showing the expansion of the two arm rods away from each other.
Figure 6:
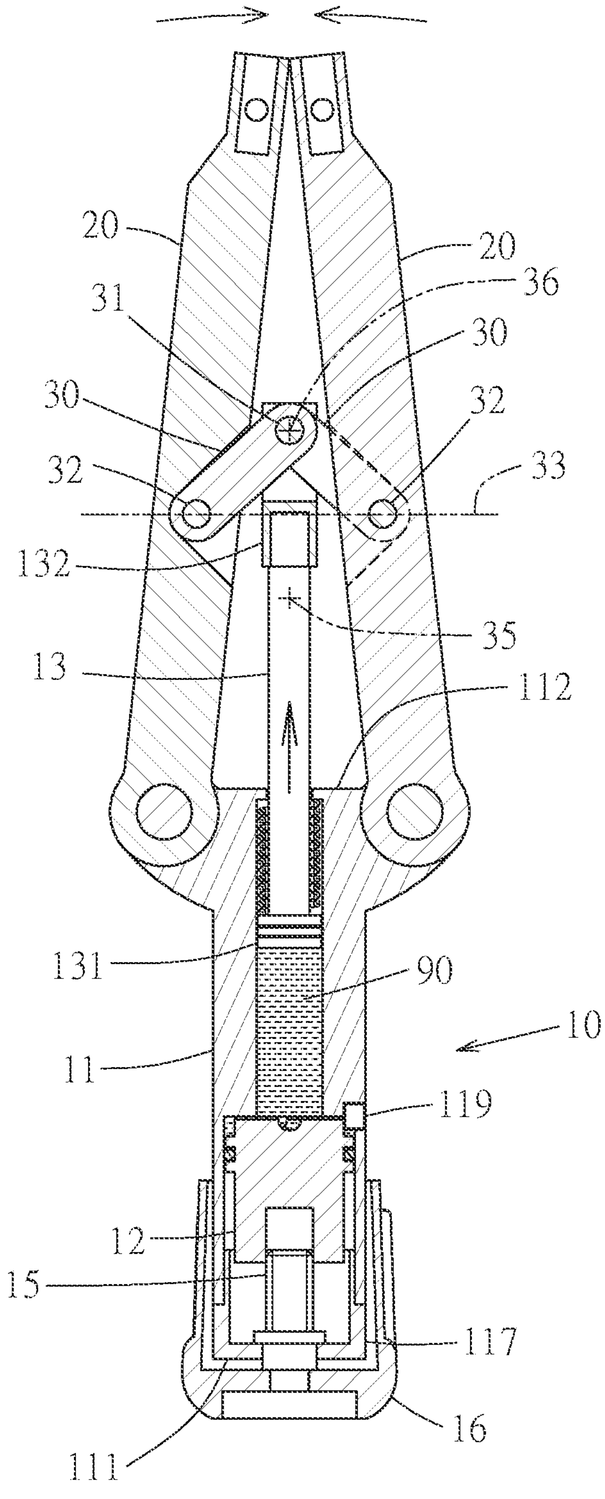
FIG. 6 is a sectional view of the operating state of a preferred embodiment of the invention, showing the retraction of two arm rods moving toward each other.

When the plunger 12 moves toward the shaft rod 13, the volume of the oil chamber 113 is reduced, thus squeezing the working fluid 90. The working fluid 90 will in turn form a pushing force upon the bearing part 131, and push the shaft rod 13 to move away from the first end 111, as shown in FIG. 5. The connecting rods 30 will rotate under the force of the connecting part 132. The connecting rods 30 will cause the arm rods 20 to rotate. As a result, the arm rods 20 will expand outward, as shown in FIG. 6. The plunger 12 moves further toward the shaft rod 13. The shaft rod 13 moves further away from the first end 111. The connecting rods 30 respectively cause the arm rods 20 to rotate further. As a result, the arm rods 20 will retract inward.

Based on an overall structure made up of the hydraulic driving structure 10 and the connecting rods 30, simply by driving the working fluid in one direction, the shaft rod 13 actuated by the working fluid 90 pumped in one-way oil-way to move in a one-way stroke can cause the arm rods 20 to expand or retract in relation to each other. When it is needed to execute both operations of expansion and retraction, the preferred embodiment can provide more convenience to the use and purchase of tools.

A first bolt pole 31 pivots each connecting rod 30 on the connecting part 132. Two second bolt poles 32 respectively pivot each connecting rod 30 and each arm rod 20. A virtual line 33 is defined to go through the second bolt pole 32, and the virtual line 33 is perpendicular to the axial direction of the shaft rod 13. The first bolt pole 31 is defined to move between a first position 35 and a second position 36, and the virtual line 33 is located between the first position 35 and the second position 36. Thus, the shaft rod 13 moves in one direction. During the process when the first bolt pole 31 moves from the first position 35 to the second position 36, the arm rods 20 completes one expansion and one retraction. During the process when the first bolt pole 31 moves from the second position 36 to the first position 35, the arm rods 20 also completes one expansion and one retraction.

FIG. 7 shows an example of applying the preferred embodiment in a pair of circlip pliers. The arm rods 20 can be configured with working pieces 80 of various structures to complete corresponding operations. It is to be noted, however, FIG. 7 cannot be construed to limit the application of the invention.

The inside of the cylinder barrel 11 is formed with a long groove 115. The oil chamber 113 is adjacent to the first end 111. The long groove 115 is extended on the second end 112. The oil chamber 113 is communicated with the long groove 115, so that the working fluid 90 can enter or leave the long groove 115. The shaft rod 13 is fitted inside the long groove 115 in the axial direction. The end of the shaft rod 13 close to the plunger 12 is expanded to form the bearing part 131. The radial periphery of the bearing part 131 is sealed against the radial wall of the long groove 115, so that the shaft rod 13 can move back and forth along the axial direction under the force of the working fluid 90.

The bearing part 131 is sleeved with an elastic second O-ring 133, so that the bearing part 131 is sealed against the radial wall of the long groove 115, thus enhancing the reliability of the working fluid 90 pushing the shaft rod 13.

The cylinder barrel 11 is formed with an abutting face 116. The abutting face 116 is located in the long groove 115. The shaft rod 13 is sleeved with a spring 14. The two ends of the spring 14 are respectively pressed against the bearing part 131 and the abutting face 116. Thus, when the plunger 12 moves away from the bearing part 131, the volume of the oil chamber 113 is expanded, the plunger 12 will absorb the working fluid 90. The spring 14 provides an elastic force to the bearing part 131, thus enhancing the reliability of the shaft rod 13 moving toward the plunger 12.

The radial area of the bearing part 131 facing the oil chamber 113 is smaller than the radial area of the plunger 12 facing the oil chamber 113. Thus, when the plunger 12 moves toward the second end 112, the displacement of the shaft rod 13 is larger than the displacement of the plunger 12, thus enhancing the immediacy of the movement of the arm rods 20.

The hydraulic driving structure 10 further comprises an actuating component 15, wherein said actuating component 15 is movably configured on the cylinder barrel 11, one end of the actuating component 15 is connected to the plunger 12, so that the actuating component 15 can actuate the plunger 12 to move toward or away from the first end 111 in the axial direction.

The actuating component 15 is formed with a flange 152. The flange 152 is located inside the cylinder barrel 11, so that the cylinder barrel 11 can block the flange 152, and fit the actuating component 15 inside the cylinder barrel 11. The actuating component 15 is screwed into the axle center of the plunger 12, so that the actuating component 15 can be rotated to actuate the plunger 12 to move linearly back and forth.

The hydraulic driving structure 10 further comprises an operating element 16, wherein said operating element 16 is located outside the cylinder barrel 11 and is opposite the first end 111, the operating element 16 is connected to the actuating component 15 to control the operating element 16 to rotate. Thus, through the operating element 16, the actuating component 15 can be operated to rotate. This operation of the actuating component 15 is very convenient.

The cylinder barrel 11 has a cover 117 that can be removed to open the oil chamber 113. The first end 111 is formed on the cover 117. The actuating component 15 is pivoted on the cover 117. By removing the cover 117, the oil chamber 113 can be opened, and the shaft rod 13 and the plunger 12 can be sequentially fitted into the cylinder barrel 11 through the opening (not shown in the figures) formed after removing the cover 117. The assembly of the plunger 12 and the shaft rod 13 into the cylinder barrel 11 becomes more convenient.

The cylinder barrel 11 is configured with an oil injection hole 118. The oil injection hole 118 is communicated with the oil chamber 113 and the outside of the cylinder barrel 11. The oil injection hole 118 is configured with a detachable sealing component 119 to block the oil injection hole 118. Without the need to remove the cover 117 and the plunger 12, simply by removing the sealing component 119, working fluid 90 can be injected into the oil chamber 113 through the oil injection hole 118. The operation of injecting working fluid 90 into the oil chamber 113 becomes more convenient.

The shaft rod 13 enters the connecting part 132 in the axial direction. The shaft rod 13 is formed with a ring surface 134. The ring surface 134 abuts the end of the connecting part 132 facing the cylinder barrel 11.

Each connecting rod 30 is respectively pivoted on the middle section of the arm rods 20. Optionally, the arm rods 20 can be respectively formed with an indentation 22. The indentations 22 are opposite each other in the lateral direction. Each of the connecting rods 30 are respectively extended into each indentation 22, so that each indentation 22 respectively limits the swing range of each connecting rod 30.

I claim:

1. An expansion and retraction movement tool comprising:

a hydraulic driving structure having a cylinder barrel and a plunger and a shaft rod, the cylinder barrel having an elongated columnar shape with a first end and a second end, the first end and the second end being opposite to each other, the cylinder barrel having an oil chamber therein, the oil chamber housing a working fluid, the plunger being movable within the cylinder barrel and positioned between the oil chamber and the first end, the plunger being adjacent the oil chamber, the plunger being tightly fitted within the oil chamber such that the plunger is movable toward or away from the first end in order change a volume of the oil chamber so as to squeeze or absorb the working fluid, the shaft rod having one end extending into the cylinder barrel so as to form a bearing part, another end of the shaft rod extending through the second end of the cylinder barrel and outwardly of the cylinder barrel, the another end of the shaft rod having a connecting part, the bearing part being opposite the plunger such that the shaft rod is axially movable back-and-forth under a force of the working fluid;

a pair of elongated arm rods laterally opposite to each other, said pair of elongated arm rods being respectively on opposite sides of the shaft rod, one end of each of said pair of elongated arm rods being respectively pivotable on the cylinder barrel, an opposite end of each of said pair of elongated arm rods being adapted to respectively configure working pieces such that the working pieces can move toward or away from each other;

a pair of connecting rods respectively pivotable on said pair of elongated arm rods, each of said pair of connecting rods being respectively pivotable with the connecting part, wherein a one-way movement of the shaft rod actuates said pair of elongated aria rods to move back-and-forth by way of said pair of connecting rods; and an actuating component movable on the cylinder barrel, said actuating component having one end connected to the plunger such that said actuating component causes the plunger to move toward or away from the first end of the cylinder barrel, wherein said actuating component has a flange positioned inside the cylinder barrel, said actuating component being screwed into a center of the plunger such that said actuating component is rotatable so as to cause the plunger to move linearly back-and-forth.

2. The expansion and retraction movement tool of claim 1, wherein each of said pair of connecting rods has a first bolt pole that allows each of said pair of connecting rods to pivot on the connecting part, a pair of second bolt poles respectively pivot each of said pair of connecting rods and each of said pair of elongated arm rods, each of the pair of second bolt poles has a virtual line extending therethrough that is perpendicular to an axis of the shaft rod, the first bolt pole being movable between a first position and a second position, wherein the virtual line is located between the first position and the second position.

3. The expansion and retraction movement tool of claim 1, wherein an elongated groove is formed inside the cylinder barrel, the oil chamber being adjacent to the first end of the cylinder barrel, the elongated groove extending to the second end of the cylinder barrel, the elongated groove communicating with the oil chamber such that the working fluid can enter or leave the elongated groove, the shaft rod being fitted within the elongated groove, the bearing part being the one end of the shaft rod, wherein a periphery of the bearing part is sealed against a wall of the elongated groove such that the shaft rod is movable back-and-forth under a force of the working fluid.

4. The expansion and retraction movement tool of claim 3, wherein the cylinder barrel has an abutting face positioned in the elongated groove, the shaft rod being sleeved with a spring, the spring having opposite ends respectively urging against the bearing part and the abutting face.

5. The expansion and retraction movement tool of claim 1, wherein a radial area of a portion of the hearing part facing the oil chamber is less than a radial area of a portion of the plunger that faces the oil chamber.

6. The expansion and retraction movement tool of claim 1, said hydraulic driving structure further comprising:

an operating element positioned outside the cylinder barrel and opposite to the first end of the cylinder barrel, said operating element being connected to said actuating component so as to allow said actuating component to rotate.

7. The expansion and retraction movement tool of claim 1, wherein said cylinder barrel has a cover that is removable so as to open the oil chamber, said actuating component being pivotable on the cover.

8. The expansion and retraction movement tool of claim 1, wherein said pair of connecting rods is respectively pivoted on a middle section of said pair of elongated arm rods.

9. The expansion and retraction movement tool of claim 8, wherein said pair of elongated arm rods has respective indentations, the indentations being laterally opposite to each other, each of the pair of connecting rods respectively extending to the indentations such that each of the indentations limits a swing range of each of said pair of connecting rods.

* * * * *